United States Patent [19]
Kawakami et al.

[11] 4,444,943
[45] Apr. 24, 1984

[54] COATING COMPOSITIONS FOR PROVIDING WATER AND BLISTER RESISTANCE TO INK-RECEPTIVE PAPER

[75] Inventors: Shigenao Kawakami, Nara; Terumasa Saka, Osaka; Hisao Takagishi, Kyoto; Shigeru Ura, Nara; Mikio Iwata, Osaka, all of Japan

[73] Assignee: Sumitomo Chemical Company, Limited, Osaka, Japan

[21] Appl. No.: 449,334

[22] Filed: Dec. 13, 1982

[30] Foreign Application Priority Data

Dec. 11, 1981 [JP] Japan .............................. 56-200684
Jan. 19, 1982 [JP] Japan ................................ 57-7255

[51] Int. Cl.$^3$ .............................................. C08L 61/22
[52] U.S. Cl. ....................................... 524/598; 524/501; 524/512; 524/538; 524/542; 524/843; 524/844; 525/427; 525/430; 428/530
[58] Field of Search ............... 524/512, 538, 542, 598, 524/843, 844, 501; 525/427, 430; 162/164.3; 428/530; 106/213, 214

[56] References Cited

U.S. PATENT DOCUMENTS 2,601,597  6/1952  Daniel, Jr. et al. ............. 162/164.3
4,246,153  1/1981  Takagishi et al. ................. 524/843
4,287,110  9/1981  Takagishi et al. ................. 524/845

Primary Examiner—Theodore E. Pertilla
Attorney, Agent, or Firm—Sughrue, Mion, Zinn, Macpeak & Seas

[57] ABSTRACT

A paper coating composition is described, containing a pigment and an aqueous binder as major components, and further containing a thermosetting resin in aqueous solution, obtained by reacting or mixing (Y) a water-soluble resin obtained by reacting urea, polyalkylenepolyamine, and dibasic carboxylic acid and reacting the resulting polyamidopolyurea with formaldehyde, (a) at least one alkylenediamine or polyalkylenepolyamine, and (b) epihalohydrin, or the reaction product between (Y) and (b) with (a).

20 Claims, No Drawings

COATING COMPOSITIONS FOR PROVIDING WATER AND BLISTER RESISTANCE TO INK-RECEPTIVE PAPER

BACKGROUND OF THE INVENTION

The present invention relates to a paper coating composition which provides coated paper having excellent water resistance, ink receptivity and excellent blister resistance, the coated paper being free from coloring and releasing only an extremely slight quantity of formaldehyde, and to a process for producing a novel thermosetting resin aqueous solution to be used as one component of the paper coating composition.

It has heretofore been known to produce coated paper having excellent printability by coating on paper a paper coating composition containing a pigment and an aqueous binder as major components and further containing auxiliary agents such as water resistance-imparting agents.

Recent years have seen remarkable progress in coated paper-producing techniques. For example, solids concentration of a coating composition is proposed to realize high-speed coating using a blade coater for the purpose of increasing productivity. Thus, it has been required to increase the solids concentration without an increase in viscosity for obtaining good coating properties.

In addition, with up-grading and speedup of printing and with rotary offset printing, a coated layer is required to possess higher water resistance, higher ink receptivity, and higher blister resistance.

In order to improve these properties, many proposals have been made, such as improvement of an aqueous binder component and improvement of auxiliary agents. For example, in order to improve water resistance, a water resistance-imparting agent is ordinarily compounded as an auxiliary agent because, though water resistance may be improved to some extent by increasing the weight ratio of aqueous binder to pigment, it in turn reduces ink receptivity upon printing coated paper.

Typical examples of the water resistance-imparting agents are those for aqueous binders. However, though conventionally used or proposed water resistance-imparting agents have some merits, they simultaneously possess serious defects, thus being practically unsatisfactory. For example, some problems with a melamine-formaldehyde precondensate are that it gives insufficient ink receptivity, that when the pH of the coating composition containing the precondensate is high, it shows insufficient water resistance, and that free formaldehyde is released from a coated paper in a significant amount. A reaction product between polyamidopolyurea and formaldehyde has not yet been provided having sufficient water-resisting effect and ink receptivity-improving effect, though such product shows some ink receptivity-improving effect, some water resistance, and releases free formaldehyde only in a slight amount from a coated paper.

Dialdehydes such as glyoxal are not preferable, because they color coated paper and show poor ink receptivity-improving effect. Multivalent metal salts such as zirconium salts are not preferable, either, because they seriously thicken the coating composition.

SUMMARY OF THE INVENTION

As a result of intensive investigations to overcome the above-described defects, it has now been found that a paper coating composition containing a specific thermosetting resin as a water resistance-imparting agent shows extremely excellent effects; thus the present invention has been achieved.

That is, the present invention is a paper coating composition which contains a pigment and an aqueous binder as major components, and further contains a thermosetting resin aqueous solution obtained by reacting or mixing (Y) a water-soluble resin obtained by reacting urea, polyalkylenepolyamine, and dibasic carboxylic acid to form a polyamidopolyurea and reacting the resulting polyamidopolyurea with formaldehyde, (a) at least one alkylenediamine or polyalkylenepolyamine, and (b) epihalohydrin; or by reacting or mixing the reaction product of (Y) and (b) with (a).

DETAILED DESCRIPTION OF THE INVENTION

The polyalkylenepolyamine to be used in the present invention is preferably a polyalkylenepolyamine having two primary amino groups and at least one secondary amino group per molecule and includes, for example, diethylenetriamine, triethylenetetramine, tetraethylenepentamine, iminobispropylamine, 3-azahexane-1,6-diamine, 4,7-diazadecane-1,10-diamine, etc. These polyalkylenepolyamines may be used alone or in combination of two or more.

Examples of dibasic carboxylic acids that can be used in the present invention include aliphatic carboxylic acids such as succinic acid, glutaric acid, adipic acid, sebacic acid, maleic acid, fumaric acid, etc.; aromatic carboxylic acid such as isophthalic acid, terephthalic acid, etc.; and mixtures thereof.

Alkylenediamines that can be used in the present invention include ethylenediamine, trimethylenediamine, 1,2-propylenediamine, tetramethylenediamine, hexamethylenediamine, etc. These alkylenediamines may be used alone or in combinations of two or more.

Examples of epihalohydrins that can be used in the present invention include epichlorohydrin and epibromohydrin, with epichlorohydrin being particularly preferable.

The polyamidopolyurea to be used in the present invention includes a polyamidopolyurea obtained by a deammoniation reaction between urea and polyalkylenepolyamine, a dehydration condensation between the resulting product and dibasic carboxylic acid, and a deammoniation reaction between the resulting product and urea (hereinafter referred to as polyamidopolyurea (I)); a polyamidopolyurea obtained by a dehydration condensation between polyalkylenepolyamine and dibasic carboxylic acid, then a deammoniation reaction between the resulting product and urea (hereinafter referred to as polyamidopolyurea (II)); and the like.

In obtaining polyamidopolyurea (I), the molar ratio of urea to polyalkylenepolyamine is 1:1.5 to 2.5, and preferably about 1:2. The reaction temperature is suitably from 100° to 200° C., and preferably from 120° to 170° C. This reaction is conducted for from 2 to 8 hours while removing ammonia produced from the reaction system. Then, the reaction product is subjected to a dehydration condensation with 0.3 to 0.7 mol, per mol of polyalkylenepolyamine used, of a dibasic carboxylic acid. This reaction is conducted at a reaction temperature of from 120° to 250° C., and preferably from 140° to 200° C., from 2 to 10 hours while removing water produced from the reaction system. The thus obtained condensation reaction product is further reacted with urea. The amount of urea reacted is from 0.2 to 1.5 moles, and preferably from 0.5 to 1.1 moles, per mole of secondary amino group in the starting polyalkylenepolyamine. The reaction temperature is from 100° to 180° C., and preferably from 120° to 150° C., and the reaction is carried out for from 1 to 5 hours while removing ammonia produced from the reaction system. Thus, polyamidopolyurea (I) is obtained.

In obtaining the polyamidopolyurea (II), the reaction between polyalkylenepolyamine and dibasic carboxylic acid is carried out at a temperature of from 120° to 250° C., and preferably from 140° to 200° C., for from 2 to 10 hours while removing water produced from the reaction system. From 1.4 to 3.0 moles, and preferably from 1.8 to 2.5 moles, of the polyalkylenepolyamine is used per mole of the dibasic carboxylic acid. The thus obtained dehydration condensation reaction product is then reacted with urea. The urea is used in an amount of from 0.2 to 1.0 mole, and preferably from 0.4 to 0.8 mole, per mole of amino group in the starting polyalkylenepolyamine. The reaction temperature is from 100° to 180° C., and preferably from 120° to 150° C. The reaction is carried out for from 1 to 5 hours while removing ammonia produced from the reaction system. As to the manner of charging the urea, the desired amount of urea may be charged at one time to react, or a part of the desired amount of urea may first be charged, and, after completion of the deammoniation reaction, the remaining amount of urea may be charged, followed by again conducting deammoniation reaction. Thus, polyaminopolyurea (II) is obtained.

The thus obtained polyamidopolyurea is dissolved in water to react it with formaldehyde. This reaction is conducted in an aqueous solution containing from 20 to 70 wt%, and preferably 30 to 60 wt%, of the polyamidopolyurea and having a pH adjusted to 7 or less, preferably 3.5 to 6.5, with an acid such as hydrochloric acid, sulfuric acid, phosphoric acid, formic acid or acetic acid, at a reaction temperature of 40° to 80° C. for 1 to 10 hours. This reaction is preferably conducted under acidic conditions as described above. However, the end product of the present invention can also be obtained by initially conducting the reaction under alkaline conditions of, for example, pH 8 to 12, adjusting the pH to 7 or less, and preferably 3.5 to 6.5, and continuing the reaction. In this case, the reaction under alkaline conditions is conducted at from 40° to 80° C. for from 0.5 to 3 hours, and the subsequent reaction under acidic conditions is carried out at from 40° to 80° C. for from 1 to 10 hours. The amount of formaldehyde is suitably from 0.2 to 1 mole, and preferably from 0.3 to 0.7 mole, per mole of the total urea used for synthesizing the polyamidopolyurea.

After completion of the reaction, the pH of the resulting reaction product may, if desired, be adjusted to from 6 to 9. The water-soluble resin thus obtained is hereinafter referred to as (Y).

The water-soluble resin (Y) obtained as described above by reacting polyamidopolyurea with formaldehyde is further reacted or mixed with (a) at least one (e.g., one, two or more) polyalkylenepolyamine or alkylenediamine and (b) epihalohydrin.

In this reaction, (Y), (a) and (b) may be reacted with each other at the same time, or (Y) and (b) may be first reacted with each other, followed by reacting the resulting reaction product with (a). In using these ingredients as a mixture, (Y) may be mixed with (a) and (b), or a reaction product between (Y) and (b) may be mixed with (a). As to the manner of addition to a paper coating composition, a previously prepared mixture may be added to a paper coating composition, or individual ingredients may separately be added to a paper coating composition.

The reaction temperature is simultaneously reacting (Y), (a) and (b) with each other is from 30° to 80° C., that of the reaction between (Y) and (b) is from 30° C. to the reflux temperature thereof, and that of the reaction between (a) and the reaction product between (Y) and (b) is from 30° C. to 100° C. These reactions are conducted for from 0.5 to 10 hours.

The amount of polyalkylenepolyamine or alkylenediamine to be used in the reaction and/or mixing is suitably from 0.1 to 3 moles, and preferably from 0.2 to 1.5 moles, per mole of the dibasic carboxylic acid used for synthesizing polyamidopolyurea. The amount of epihalohydrin is suitably from 0.1 to 4 moles, and preferably 0.5 to 3 moles, per mole of the polyalkylenepolyamine or alkylenediamine used.

After completion of the reaction or mixing, the pH of the resulting reaction product or mixture may, if desired, be adjusted to from 2.5 to 8.

The paper coating composition of the present invention is prepared in a conventional manner, but, for fully attaining the effect, an aqueous binder is compounded in a solid amount of from 3 to 30 wt%, and preferably from 5 to 20 wt%, based on the weight of pigment, and the thermosetting resin aqueous solution of the present invention obtained by reacting or mixing (Y), (a), and (b) is compound in a solid amount of from 0.05 to 5 wt%, and preferably from 0.1 to 2 wt%, based on the weight of pigment.

As the water resistance-imparting agent, that specified according to the present invention exerts fully sufficient effects, but in some cases, it may be partially substituted by other water resistance-imparting agents.

As the aqueous binder and the pigment to be used in preparing the paper coating composition of the present invention, those conventionally known may be used. The aqueous binder is exemplified by water-soluble binders such as starch, oxidized starch, modified starch, polyvinyl alcohol, casein, gelatin, carboxymethyl cellulose, hydroxyethyl cellulose, soybean protein, etc.; and water emulsion or dispersion system binders such as styrene-butadiene type resin, vinyl acetate resin, ethylene-vinyl acetate resin, methyl methacrylate resin, etc.

The pigment includes, for example, inorganic pigments such as kaolin clay, talc, titanium dioxide, aluminum hydroxide, calcium carbonate, satin white, barium sulfate, etc.; and organic pigments containing sytrene, urea, etc., as major components. These may be used alone or in combinations of two or more in any desired mixing ratio.

The paper coating composition of the present invention may contain, if desired, other ingredients such as a dispersing agent, a thickening agent, a thinning agent, a defoaming agent, a foam inhibitor, an antiseptic, an antifungal agent, a fluidity-adjusting agent, a repellent, a colorant (e.g., a dye, colored pigment, etc.), an agent for imparting special properties (e.g., an electroconductive agent), etc.

The coating composition of the present invention can be prepared in a manner analogous to conventional coating compositions. Usually, the solids concentration of the coating composition is adjusted to from 30 to 80 wt%, and preferably from 50 to 65 wt.%.

The paper coating composition of the present invention is coated on a paper substrate in a conventionally known manner using a blade coater, air-knife coater, roll coater, size-press coater, cast coater, or the like, subjected to necessary drying in an ordinary manner, and, if desired, subjected to super calendering, machine calendering, or the like to produce coated paper.

The paper coating composition of the present invention obtained as described above has numerous merits; it suffers no color shocks (a serious increase in viscosity of the composition, aggregation of pigment, etc.), shows excellent stability, and, when coated on a paper substrate, it forms thereon an excellent water-resisting coating layer, releases only a remarkably decreased amount of formaldehyde, shows improved ink receptivity, undergoes no coloration, and imparts improved blister resistance in rotary offset printing.

The present invention will now be described in more detail by referring to examples and comparative examples, in which percentages are by weight unless otherwise specified.

EXAMPLE 1

(1) Synthesis of Resin (A)

292 g of (2 moles) of triethylenetetramine and 60 g (1 mole) of urea were charged in a four-neck flask equipped with a thermometer, a reflux condenser, and a stirring rod, and reaction was carried out at 145° to 150° C. for 4 hours with removing ammonia produced from the reaction system. Then, 146 g (1 mole) of adipic acid was added thereto, and condensation reaction was conducted at 150° to 155° C. for 5 hours. After cooling the reaction mixture to 120° C., 240 g (4 moles) of urea was added thereto, and a deammoniation reaction was conducted at 125° C. to 130° C. for 2 hours, followed by gradual addition of 1,350 g of water to obtain an aqueous solution of polyamidopolyurea.

Thereafter, 202.5 g (2.5 moles) of 37% formalin was added thereto, pH of the resulting mixture was adjusted to 5 with concentrated hydrochloric acid, and the mixture was kept at 65° C. for 4 hours while stirring to obtain a water-soluble resin (A) containing 30 wt% solids.

(2) Synthesis of Resin (B)

Resin (A) was prepared in the same manner as in (1), and 92.5 g (1 mole) of epichlorohydrin and 217 g of water were added thereto. The resulting mixture was kept at 60° C. for 2 hours while stirring, then cooled to 25° C. to obtain a thermosetting resin (B) containing 30 wt% solids.

(3) Synthesis of Resin (C)

Resin (A) was prepared in the same manner as in (1), and 210 g of water, 146 g (1 mole) of triethylenetetramine, and 92.5 g (1 mole) of epichlorohydrin were added thereto. The resulting mixture was kept at 60° C. for 2 hours while stirring, then cooled to 25° C. to obtain a thermosetting resin (C) containing 35% solids.

(4) Synthesis of Resin (D)

Resin (B) was prepared in the same manner as in (2), and 73 g (0.5 mole) of triethylenetetramine and 170 g of water were added thereto. The resulting mixture was kept at 60° C. for 3 hours while stirring, then cooled to 25° C. to obtain a thermosetting resin (D) containing 30 wt% solids.

(5) Synthesis of Resin (E)

206 g (2 moles) of diethylenetriamine and 60 g (1 mole) of urea were charged in the same apparatus as in (1), and a deammoniation reaction was carried out at 140° to 145° C. for 5 hours. Then, 146 g (1 mole) of adipic acid was added thereto, and dehydration condensation was conducted at 160° to 170° C. for 2 hours. After cooling the reaction mixture to 120° C., 120 g (2 moles) of urea was added thereto, and deammoniation reaction was carried out at 130° to 140° C. for 1.5 hours, followed by gradual addition of 900 g of water to obtain an aqueous solution of polyamidopolyurea.

Then, 145.8 g (1.8 moles) of 37% formalin was added to the aqueous solution, and the resulting mixture was adjusted to 4.5 in pH with 20 N sulfuric acid and kept at 60° C. for 3 hours while stirring. Subsequently, 185 g (2 moles) of epichlorohydrin and 277 g of water were added thereto, and the resulting mixture was kept at 60° C. for 3 hours while stirring, then cooled to 25° C. to obtain a thermosetting resin (E) containing 40% solids.

(6) Synthesis of Resin (F)

Resin (E) was prepared in the same manner as in (5), and 146 g (1 mole) of diethylenetriamine and 219 g of water were added thereto to obtain a thermosetting resin (F) containing 40% solids.

(7) Synthesis of Resin (G)

365 g (2.5 moles) of triethylenetetramine, 20 g of water, and 146 g (1 mole) of adipic acid were charged in the same apparatus as in (1), and a dehydration condensation was conducted at 155° to 160° C. for 4 hours. Then, 60 g (1 mole) of urea was added thereto, and a deammoniation reaction was conducted at 145° to 150° C. for 3 hours. The reaction mixture was cooled to 130° C., and 240 g (4 moles) of urea was added thereto. Then, a deammoniation reaction was conducted at 130° to 140° C. for 3 hours, followed by gradual addition of 595 g of water to obtain an aqueous solution of polyamidopolyurea.

Then, 162 g (2 moles) of a 37% formalin was added thereto, and the resulting mixture was adjusted to 4.5 in pH with 20 N sulfuric acid and kept at 60° C. for 4 hours while stirring.

Subsequently, 180 g of water, 51.5 g (0.5 mole) of diethylenetriamine, and 92.5 g (1 mole) of epichlorohydrin were added thereto, and the resulting mixture was kept at 65° C. for 2.5 hours while stirring. The reaction solution was cooled to 25° C. to obtain a thermosetting resin (G) containing 50% solids.

(8) Synthesis of Resin (H)

206 g (2 moles) of diethylenetriamine and 60 g (1 mole) of urea were charged in the same reaction apparatus as in (1), and a deammoniation reaction was conducted at 145° to 150° C. for 3 hours. Then, 118 g (1 mole) of succinic acid was added thereto, and a dehydration condensation was conducted at 150° C. for 4 hours. After cooling the reaction solution to 130° C., 96 g (1.6 moles) of urea was added thereto, and a deammoniation reaction was conducted at 125° to 130° C. for 3 hours, followed by gradual addition of 540 g of water to obtain an aqueous solution of polyamidopolyurea.

Then, 105.3 g (1.3 moles) of 37% formalin was added thereto, and the solution was adjusted to 10 in pH with 10 N sodium hydroxide, kept at 60° C. for 2 hours while stirring, adjusted to 5.5 in pH with concentrated hydrochloric acid, and kept at 60° C. for 3 hours while stirring. Thereafter, 250 g of water, 103 g (1 mole) of diethylenetriamine, and 46.3 g (0.5 mole) of epichlorohydrin were added thereto. The resulting mixture was kept at 65° C. for 2 hours while stirring, then cooled to 25° C. to obtain a thermosetting resin (H) containing 40% solids.

(9) Synthesis of Resin (I)

185.4 g (1.8 moles) of diethylenetriamine, 10 g of water, and 118 g (1 mole) of succinic acid were charged in the same apparatus as in (1), and dehydration condensation was carried out at 150° to 155° C. for 8 hours. After cooling the reaction solution to 120° C., 180 g (3 moles) of urea was added thereto, and, after raising the temperature of the solution to 130° C., a deammoniation reaction was conducted at 130° to 135° C. for 4 hours. Then, 860 g of water was gradually added thereto to obtain an aqueous solution of polyamidopolyurea. 145.8 g (1.8 moles) of a 37% formalin was added thereto, and the resulting solution was adjusted to 10 in pH with 10 N sodium hydroxide aqueous solution, kept at 60° C. for 2 hours, adjusted to 5.5 in pH with concentrated hydrochloric acid, and kept at 60° C. for 3 hours while stirring. Subsequently, 160 g of water, 219 g (1.5 moles) of triethylenetetramine, and 92.5 g (1.0 mole) of epichlorohydrin were added thereto, and the resulting solution was kept at 65° C. for 3 hours while stirring. The reaction solution was cooled to 25° C. to obtain a thermosetting resin (I) containing 40% solids.

(10) Synthesis of Resin (J)

103 g (1 mole) of diethylenetriamine, 146 g (1 mole) of triethylenetetramine, 20 g of water, and 100 g (0.77 mole as dibasic carboxylic acid) of a dibasic carboxylic acid mixture composed of 22% of succinic acid, 64% of glutaric acid, and 14% of adipic acid were charged in the same reaction apparatus as in (1), and dehydration condensation was conducted at 160° to 165° C. for 4 hours. Then, 60 g (1 mole) of urea was added thereto to conduct a deammoniation reaction at 145° to 150° C. for 4 hours. The reaction solution was cooled to 130° C., and 180 g (3 moles) of urea was added thereto to conduct a deammoniation reaction at 130° to 140° C. for 5 hours. Thereafter, 410 g of water was gradually added thereto to obtain a polyamidopolyurea aqueous solution. 97.2 g (1.2 moles) of a 37% formalin was added thereto, and the resulting solution was adjusted to 4 in pH with concentrated hydrochloric acid, and kept at 50° C. for 6 hours while stirring. Then, 280 g of water, 146 g (1 mole) of triethylenetetramine, and 92.5 g (1 mole) of epichlorohydrin were added thereto. The resulting mixture was kept at 60° C. for 2 hours while stirring, then cooled at 25° C. to obtain a thermosetting resin (J) containing 50% solids.

(11) Synthesis of Resin (K)

206 g (2 moles) of diethylenetriamine, 10 g of water, and 146 g (1 mole) of adipic acid were charged in the same reaction apparatus as in (1), and the temperature of the mixture was raised to 150° C., then kept at 150° to 155° C. for 6 hours while evaporating of water produced. Then, after cooling the reaction solution to 130° C., 240 g (4 moles) of urea was added thereto, and a deammoniation reaction was conducted at 125° to 130° C. for 3 hours while removing ammonia produced from the reaction system. Thereafter, 420 g of water was gradually added thereto to obtain an aqueous solution of polyamidopolyurea.

Then, 162 g (2 moles) of a 37% formalin was added thereto and, after adjusting to pH=5 with concentrated hydrochloric acid, kept at 65° C. for 3 hours while stirring. Subsequently, 225 g of water, 73 g (0.5 mole) of triethylenetetramine, 51.5 g (0.5 mole) of diethylenetriamine, and 92.5 g (1.0 mole) of epichlorohydrin were added thereto, and the resulting mixture was kept at 65° C. for 2 hours while stirring. This reaction solution was cooled to 25° C. to obtain a thermosetting resin (K) containing 50% solids.

(12) Synthesis of Resin (L)

292 g (2 moles) of triethylenetetramine and 60 g (1 mole) of urea were added to the same reaction apparatus as in (1), and the reaction was conducted at 145° to 150° C. for 4 hours while removing ammonia from the system. Then, 146 g (1 mole) of adipic acid was added thereto to conduct condensation reaction at 150° to 155° C. for 5 hours. After cooling the mixture to 120° C., 240 g (4 moles) of urea was added thereto to conduct a deammoniation reaction for 2 hours at 125° to 130° C. Then, 1,350 g of water was gradually added thereto to obtain an aqueous solution of polyamidopolyurea. 202.5 g (2.5 moles) of 37% formalin was added thereto, and, after adjusting to pH=5 with concentrated hydrochloric acid, the resulting solution was kept at 65° C. for 4 hours while stirring. Then, 130 g of water, 120 g (2 moles) of ethylenediamine, and 278 g (3 moles) of epichlorohydrin were added thereto, and the resulting mixture was kept at 60° C. for 3 hours while stirring, then cooled to 25° C. to obtain a thermosetting resin (L) containing 40% solids.

EXAMPLES 2 TO 15

(1) Preparation of Paper Coating Compositions

Kaolin clay, calcium carbonate, and aluminum hydroxide were used as pigments. To a pigment slurry dispersed in water by adding a sodium polyacrylate type dispersing agent were added an aqueous solution of previously gelatinized oxidized starch and a styrenebutadiene latex. Further, water resistance-imparting agents were added in amounts as indicated in Table 1, and the resulting mixtures were stirred well to properly mix the ingredients. The pH of the compositions was finally adjusted to 9.5 with a sodium hydroxide aqueous solution, and the solids concentration thereof was adjusted to 55 wt% to prepare paper coating compositions. Additionally, the basic compounding ratios of ingredients other than the water resistance-imparting agents in the compositions are shown in Table 1.

(2) Preparation of Coated Paper

Each of the compositions obtained as described above was coated on both sides of a base paper of 85 g/m$^2$ in basis weight in an amount of about 15 g/m$^2$ per one side of the paper using a coating rod, then dried in hot air at 120° C. for 30 minutes. Then, the resulting coated papers were subjected to super calendering (roll temperature: 60° C.; roll linear pressure: 60 kg/cm; passing time: twice), and conditioned at 20° C. and 65% RH to be used as test samples for various tests.

(3) Various Testing Methods (A) Physical properties of coating solution:

(i) pH of coating solution—measured at 20° C. on a glass electrode pH meter
(ii) Viscosity of coating solution—measured at 20° C. and 60 rpm on a Brookfield viscometer (B) Physical properties of coated paper:
(i) Water resistance of coated film:
(a) Wet Rub method:
About 0.1 ml of deionized water was dropped onto a coated paper, and rubbed seven times with the tip of a finger. The eluate was transferred to a black paper to judge the amount of the eluate with the naked eye.

The judgement was conducted by assigning a value ranging from 1 (poor water resistance) to 5 (excellent water resistance).

(b) Wet Pick method:
The coated surface was wetted by a water supply roll using an RI ester (made by Akira Seisakusho) and subjected to printing to observe and judge the state of delamination and damage of coated layer with the naked eye according to the same judging rating as in Wet Rub method.

(ii) Determination of formaldehyde released from coated paper—according to the acetylacetone method described in JIS L-1041, liquid phase extraction method (2).

Additionally, determination of formaldehyde was conducted, for example, by sealing the sample in a polyethylene bag for protecting it from formaldehyde released from other samples or for preventing exhalation of formaldehyde from the sample.

(iii) Ink receptivity of coated paper:
Samples were printed according to either of the following methods using an RI tester, and ink receptivity was observed and judged with the naked eye. The judgement was conducted by assigning a value ranging from 5 (good) to 1 (poor).

(a) Method A:
Water was dropwise added to an ink under milling, then the resulting ink was used for printing.

(b) Method B:
The coated surface of a sample was wetted with a water supply roll, then printed.

(c) Method C:
Printing was conducted by combining the above-described Methods A and B.

(iv) Whiteness and heat-resistant whiteness:

Whiteness of a coated paper sample before and afer heat treatment at 150° C. for 30 minutes using a hot-air drying machine was measured according to JIS P-8123 by measuring the B value on a Hunter reflectometer. The higher the value, the better the whiteness.

(v) Blister resistance:
A double-coated paper sample was printed on both sides with an ink for rotary offset printing using a RI tester and, after conditioning, it was dipped in a heated silicone oil bath to determine the minimum temperature at which blistering took place.

(4) Results of Tests
Resins obtained in Example 1 were used to evaluate them according to the manners described above. Resins used and compounding formulations are shown in Table 2.

Results of the tests on their properties are also shown in Table 2.

COMPARATIVE EXAMPLES 1 AND 2

A coating composition was prepared in the same manner as in the Examples above except for not using resins (B) to (L), polyalkylenepolyamine, alkylenediamine and epihalohydrin as water resistance-imparting agents to evaluate their properties. Compounding formulations and results of tests on properties are shown in Table 3.

COMPARATIVE EXAMPLES 3 TO 6

A coating solution was prepared in the same manner as in Examples except for using resin (A) or (B) alone as a water resistance-imparting agent for evaluating its properties. Compounding formulations and results of the tests on properties are shown in Table 3.

TABLE 1

| Compound Ingredient | Formulation No. 1 | Formulation No. 2 |
|---|---|---|
| Kaolin clay | 85 parts by weight | 80 parts by weight |
| Calcium carbonate | 15 parts by weight | 0 parts by weight |
| Aluminum hydroxide | 0 parts by weight | 20 parts by weight |
| Dispersing agent (sodium polyacrylate) | 0.4 parts by weight | 0.4 parts by weight |
| Styrene-butadiene type latex | 10 parts by weight | 10 parts by weight |
| Oxidized starch | 6 parts by weight | 6 parts by weight |

TABLE 2

| Item | Paper Coating Composition | | | | | |
|---|---|---|---|---|---|---|
| | Ex. 2 | Ex. 3 | Ex. 4 | Ex. 5 | Ex. 6 | Ex. 7 |
| Compounding Formulation | | | | | | |
| Water resistance-imparting agent | Resin (A) 0.35 part | Resin (B) 0.45 part | Resin (C) 0.5 part | Resin (D) 0.5 part | Resin (E) 0.4 part | Resin (F) 0.5 part |
| Epihalohydrin (part) | Epichlorohydrin 0.1 | No | No | No | No | No |
| Alkylenediamine or polyalkylenepolyamine (part) | Triethylenetetramine 0.05 | Triethylenetetramine 0.05 | No | No | Tetraethylenepentamine 0.1 | No |
| Formulation No. | 1 | 1 | 1 | 1 | 1 | 2 |
| Physical properties of coating composition | | | | | | |
| Viscosity (cps) | | | | | | |
| Upon prep. | 540 | 560 | 560 | 550 | 580 | 480 |
| After 24 hrs. | 590 | 600 | 600 | 600 | 620 | 530 |
| pH (upon prep.) | 9.5 | 9.4 | 9.5 | 9.5 | 9.5 | 9.6 |

TABLE 2-continued

| Properties of coated paper | | | | | | |
|---|---|---|---|---|---|---|
| Coated amount/side (g/m$^2$) | 15.0 | 1.50 | 14.9 | 15.2 | 15.3 | 14.9 |
| Water resistance | | | | | | |
| Wet Pick method | 4.7 | 4.8 | 4.8 | 4.7 | 4.8 | 4.9 |
| Wet Rub method | 4.7 | 4.8 | 4.9 | 4.8 | 4.8 | 4.8 |
| Amount of released formaldehyde (ppm) | 8 | 9 | 8 | 9 | 9 | 9 |
| Ink receptivity | | | | | | |
| Method A | 4.7 | 4.8 | 4.9 | 4.8 | 4.9 | 4.8 |
| Method B | 4.8 | 4.9 | 4.9 | 4.7 | 4.8 | 4.7 |
| Method C | 4.7 | 4.8 | 4.8 | 4.8 | 4.8 | 4.7 |
| Whiteness (%) | | | | | | |
| Before heat treatment | 80.0 | 79.9 | 80.1 | 79.9 | 80.0 | 80.2 |
| After heat treatment | 78.0 | 77.9 | 78.0 | 78.1 | 78.1 | 77.8 |
| Blisrer resistance (°C.) | 220 | 230 | 240 | 230 | 240 | 230 |

| | Paper Coating Composition | | | | | | | |
|---|---|---|---|---|---|---|---|---|
| Item | Ex. 8 | Ex. 9 | Ex. 10 | Ex. 11 | Ex. 12 | Ex. 13 | Ex. 14 | Ex. 15 |
| Compounding Formulation | | | | | | | | |
| Water resistance-imparting agent | Resin (B) 0.35 part | Resin (D) 0.5 part | Resin (G) 0.5 part | Resin (H) 0.5 part | Resin (I) 0.5 part | Resin (J) 0.5 part | Resin (K) 0.5 part | Resin (L) 0.5 part |
| Epihalohydrin (part) | No | No | No | No | No | No | No | No |
| Alkylenediamine or polyalkylene-polyamine (part) | Diethylenetriamine 0.15 | No | No | No | No | No | No | No |
| Formulation No. | 2 | 2 | 1 | 1 | 1 | 2 | 2 | 2 |
| Physical properties of coating composition | | | | | | | | |
| Viscosity (cps) | | | | | | | | |
| Upon prep. | 450 | 470 | 560 | 570 | 570 | 470 | 480 | 480 |
| After 24 hrs. | 520 | 520 | 600 | 600 | 610 | 520 | 520 | 520 |
| pH (upon prep.) | 9.4 | 9.5 | 9.5 | 9.5 | 9.4 | 9.4 | 9.5 | 9.5 |
| Properties of coated paper | | | | | | | | |
| Coated amount/side (g/m$^2$) | 14.9 | 15.1 | 14.8 | 15.0 | 15.0 | 15.1 | 14.9 | 15.0 |
| Water resistance | | | | | | | | |
| Wet Pick method | 4.8 | 4.8 | 4.8 | 4.7 | 4.7 | 4.7 | 4.8 | 4.8 |
| Wet Rub method | 4.8 | 4.7 | 4.8 | 4.8 | 4.8 | 4.8 | 4.8 | 4.8 |
| Amount of released formaldehyde (ppm) | 8 | 9 | 7 | 9 | 8 | 7 | 7 | 7 |
| Ink receptivity | | | | | | | | |
| Method A | 4.8 | 4.8 | 4.8 | 4.8 | 4.9 | 4.8 | 4.7 | 4.7 |
| Method B | 4.7 | 4.8 | 4.7 | 4.8 | 4.9 | 4.8 | 4.8 | 4.7 |
| Method C | 4.7 | 4.8 | 4.7 | 4.8 | 4.9 | 4.8 | 4.8 | 4.8 |
| Whiteness (%) | | | | | | | | |
| Before heat treatment | 79.8 | 80.1 | 79.7 | 79.9 | 79.9 | 80.0 | 79.8 | 80.2 |
| After heat treatment | 78.0 | 78.0 | 77.9 | 78.0 | 78.0 | 78.2 | 78.1 | 78.0 |
| Blisrer resistance (°C.) | 220 | 220 | 230 | 220 | 230 | 230 | 230 | 230 |

TABLE 3

| | Paper Coating Composition | | | | | |
|---|---|---|---|---|---|---|
| Item | Comparative Example 1 | Comparative Example 2 | Comparative Example 3 | Comparative Example 4 | Comparative Example 5 | Comparative Example 6 |
| Compounding formulation | | | | | | |
| Water resistance-imparting agent (part) | No | No | Resin (A) 0.5 | Resin (A) 0.5 | Resin (B) 0.5 | Resin (B) 0.5 |
| Epihalohydrin | No | No | No | No | No | No |
| Alkylenediamine or polyalkylene-polyamine | No | No | No | No | No | No |
| Formulation No. | 1 | 2 | 1 | 2 | 1 | 2 |
| Physical properties of coating composi- | | | | | | |

TABLE 3-continued

| | Paper Coating Composition | | | | | |
|---|---|---|---|---|---|---|
| Item | Comparative Example 1 | Comparative Example 2 | Comparative Example 3 | Comparative Example 4 | Comparative Example 5 | Comparative Example 6 |
| tion | | | | | | |
| Viscosity (cps) | | | | | | |
| Upon prep. | 560 | 470 | 530 | 460 | 550 | 480 |
| After 24 hrs. | 600 | 510 | 550 | 490 | 590 | 500 |
| pH (upon prep.) | 9.5 | 9.5 | 9.6 | 9.5 | 9.5 | 9.5 |
| Properties of coated paper | | | | | | |
| Coated amount/side (g/m$^2$) | 15.3 | 15.7 | 14.8 | 15.2 | 14.9 | 15.0 |
| Water resistance | | | | | | |
| Wet pick method | 1.0 | 1.0 | 3.8 | 3.5 | 4.2 | 4.0 |
| Wet rub method | 1.0 | 1.0 | 3.8 | 3.8 | 4.2 | 4.0 |
| Amount of released formaldehyde (ppm) | 1 | 1 | 9 | 9 | 8 | 9 |
| Ink receptivity | | | | | | |
| Method A | 1.5 | 1.5 | 4.0 | 4.0 | 4.3 | 4.2 |
| Method B | 1.5 | 1.5 | 4.0 | 4.0 | 4.3 | 4.2 |
| Method C | 1.0 | 1.0 | 3.5 | 3.8 | 4.0 | 4.0 |
| Whiteness (%) | | | | | | |
| Before heat treatment | 79.8 | 79.0 | 80.0 | 80.1 | 80.0 | 79.9 |
| After heat treatment | 77.5 | 77.0 | 78.1 | 78.1 | 77.9 | 78.0 |
| Blister resistance (°C.) | 180 | 180 | 200 | 200 | 210 | 210 |

While the invention has been described in detail and with reference to specific embodiment thereof, it will be apparent to one skilled in the art that various changes and modifications can be made therein without departing from the spirit and scope thereof.

What is claimed is:

1. A paper coating composition containing a pigment and an aqueous binder as major components, and further containing a thermosetting resin in aqueous solution, obtained by reacting or mixing (Y) a water-soluble resin obtained by reacting urea, polyalkylenepolyamine, and dibasic carboxylic acid to form a polyamidopolyurea and reacting the resulting polyamidopolyurea with formaldehyde, (a) at least one alkylenediamine or polyalkylenepolyamine, and (b) epihalohydrin, or the reaction product between (Y) and (b) with (a).

2. A composition as in claim 1, wherein said water-soluble resin (Y) is a water-soluble resin obtained by a deammoniation reaction between urea and polyalkylenepolyamine, then a dehydration condensation between the reaction product and dibasic carboxylic acid, and a deammoniation reaction between the resulting product and urea, and a reaction of the thus obtained polyamidopolyurea with formaldehyde in an aqueous solution under an acidic condition, or initially under an alkaline condition and then under an acidic condition.

3. A composition as in claim 1, wherein said water-soluble resin (Y) is a water-soluble resin obtained by a dehydration condensation between polyalkylenepolyamine and dibasic carboxylic acid, then a deammoniation reaction between the reaction product and urea, and a reaction of the thus obtained polyamidopolyurea with formaldehyde in an aqueous solution under an acidic condition, or initially under an alkaline condition and then under an acidic condition.

4. A composition as in claim 2, wherein from 1.5 to 2.5 moles of polyalkylenepolyamine per mole of urea is used in the reaction between urea and polyalkylenepolyamine, and subsequently dibasic carboxylic acid is used in an amount of from 0.3 to 0.7 mole per mole of the polyalkylenepolyamine, and subsequently urea is used in an amount of from 0.2 to 1.5 moles per mole of secondary amino group in the polyalkylenepolyamine.

5. A composition as in claim 2, wherein the temperature during the reaction between urea and polyalkylenepolyamine is maintained at from 100° to 200° C., the temperature during the reaction between the resulting product and dibasic carboxylic acid is maintained at from 120° to 250° C., and the temperature during the reaction between the resulting product and urea is maintained at from 100° to 180° C.

6. A composition as in claim 3, wherein from 1.4 to 3.0 moles of polyalkylenepolyamine is used per mole of dibasic carboxylic acid in the reaction between the dibasic carboxylic acid and the polyalkylenepolyamine, and the amount of urea used is from 0.2 to 1.0 mole per mole of the amino group of polyalkylenepolyamine.

7. A composition as in claim 3, wherein the temperature during the reaction between the dibasic carboxylic acid and the polyalkylenepolyamine is maintained at from 120° to 250° C., and the temperature during the reaction between the resulting product and urea is maintained at from 100° to 180° C.

8. A composition as in claim 1, wherein the amount of formaldelyde is from 0.2 to 1 mole per mole of the total amount of urea used for synthesizing the polyamidopolyurea.

9. A composition as in claim 1, wherein the temperature during the reaction between formaldehyde and polyamidopolyurea is maintained at from 40° to 80° C.

10. A composition as in claim 1, wherein the amount of (a) is from 0.1 to 3 moles per mole of the dibasic carboxylic acid used for synthesizing (Y).

11. A composition as in claim 1, wherein the amount of (b) is from 0.1 to 4 moles per mole of (a).

12. A composition as in claim 1, wherein the temperature during the simultaneous reaction of (Y), (a), and (b) is maintained from 30° to 80° C.

13. A composition as in claim 1, wherein the temperature of the reaction between (Y) and (b) is 30° C. to reflux temperature, and the temperature of the reaction between the resulting product and (a) is 30° to 100° C.

14. A composition as in claim 1, wherein the polyalkylenepolyamine is a compound having two primary amino groups and at least one secondary amino group per molecule.

15. A composition as in claim 1, wherein said dibasic carboxylic acid is an aliphatic dibasic carboxylic acid.

16. A composition as in claim 1, wherein the solids content of the aqueous binder is from 3 to 30 wt% based on the weight of pigment.

17. A composition as in claim 1, wherein the solids content of the thermosetting resin obtained from (a), (b), and (Y) is 0.05 to 5 wt%, based on the weight of the pigment.

18. A composition as in claim 1, which contains from 30 to 80 wt% solids.

19. A process for preparing a thermosetting resin in aqueous solution, comprising simultaneously reacting (Y) a water-soluble resin obtained by reacting urea, polyalkylenepolyamine, and dibasic carboxylic acid, and further reacting the resulting polyamidopolyurea with formaldehyde, (a) at least one alkylenediamine or polyalkylenepolyamine, and (b) epihalohydrin, or reacting the reaction product between (Y) and (b) with (a).

20. A coated paper having coated thereon a paper coating composition described in claim 1.

* * * * *